United States Patent
Dimov

(10) Patent No.: US 11,443,000 B2
(45) Date of Patent: Sep. 13, 2022

(54) SEMANTIC ROLE BASED SEARCH ENGINE ANALYTICS

(71) Applicant: SAP SE, Walldorf (DE)

(72) Inventor: Stefan Dimov, Mountain View, CA (US)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 16/877,463

(22) Filed: May 18, 2020

(65) Prior Publication Data

US 2021/0357467 A1 Nov. 18, 2021

(51) Int. Cl.
| | |
|---|---|
| *G06F 16/00* | (2019.01) |
| *G06F 16/9535* | (2019.01) |
| *G06F 16/9532* | (2019.01) |
| *G06F 40/30* | (2020.01) |
| *G06F 16/9035* | (2019.01) |
| *G06F 16/242* | (2019.01) |
| *G06F 16/9538* | (2019.01) |

(52) U.S. Cl.
CPC ........ *G06F 16/9535* (2019.01); *G06F 16/244* (2019.01); *G06F 16/9035* (2019.01); *G06F 16/9532* (2019.01); *G06F 16/9538* (2019.01); *G06F 40/30* (2020.01)

(58) Field of Classification Search
CPC .............. G06F 16/9535; G06F 16/244; G06F 16/9035; G06F 16/9532; G06F 16/9538; G06F 40/30; G06F 16/243
See application file for complete search history.

(56) References Cited

U.S. PATENT DOCUMENTS

| | | | | |
|---|---|---|---|---|
| 8,316,039 | B2* | 11/2012 | Vanderwende | G06F 16/338 707/759 |
| 8,498,983 | B1* | 7/2013 | Zhang | G06F 16/3346 706/14 |
| 9,449,080 | B1* | 9/2016 | Zhang | G06F 16/3346 |
| 9,471,681 | B1* | 10/2016 | Amacker | G06F 16/248 |
| 10,776,417 | B1* | 9/2020 | Ravichandran | G06V 10/454 |
| 10,872,124 | B2 | 12/2020 | Dimov | |
| 11,238,515 | B1* | 2/2022 | de Mesa | G06F 16/583 |
| 2001/0044758 | A1* | 11/2001 | Talib | G06Q 10/10 705/26.1 |
| 2008/0263019 | A1* | 10/2008 | Harrison | G06F 16/3334 |
| 2009/0063473 | A1* | 3/2009 | Van Den Berg | G06F 16/3344 707/999.005 |
| 2016/0217509 | A1* | 7/2016 | Eggleston, IV | G06Q 30/0283 |
| 2017/0132318 | A1* | 5/2017 | Xu | G06F 16/358 |
| 2018/0293302 | A1* | 10/2018 | Ko | G06F 16/35 |

* cited by examiner

*Primary Examiner* — Jared M Bibbee
(74) *Attorney, Agent, or Firm* — Mintz Levin Cohn Ferris Glovsky and Popeo, P.C.

(57) ABSTRACT

A method may include receiving a search phrase including a first word. In response to receiving the search phrase, a database may be queried to retrieve an item description matching the search phrase. The first item description may match the search phrase by including a second word that matches the first word in the search phrase. A semantic role for the first word included in the search phrase may be determined based on a semantic role of the second word included in the item description. An analytics result associated with the search phrase may be generated based on the semantic role of first word included in the search phrase. Related systems and articles of manufacture, including computer program products, are also provided.

20 Claims, 7 Drawing Sheets

SEMANTIC ROLE BASED SEARCH ENGINE ANALYTICS

TECHNICAL FIELD

The subject matter described herein relates generally to database processing and more specifically to techniques for analyzing search phrases.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program items, are provided for search phrase analysis. In one aspect, there is provided a system. The system may include at least one data processor and at least one memory. The at least one memory may store instructions that cause operations when executed by the at least one data processor. The operations may include: receiving a search phrase including a first word; in response to receiving the search phrase, querying a database to at least retrieve, from the database, a first item description matching the search phrase, the first item description associated with a first item, and the first item description matching the search phrase by at least including a second word that matches the first word in the search phrase; determining, based at least on a semantic role of the second word included in the first item description, a semantic role for the first word included in the search phrase; and generating, based at least on the semantic role of first word included in the search phrase, an analytics result associated with the search phrase.

In some variations, one or more features disclosed herein including the following features can optionally be included in any feasible combination. The semantic role for the second word may be a headword identifying the first item.

In some variations, the semantic role of the second word may be a color attribute of the first item, a finish attribute of the first item, or a material attribute of the first item. The analytics result may identify the first item having a first color attribute, a first finish attribute, and/or a first material attribute as being associated with a larger quantity of purchases than the first item having a second color attribute, a second finish attribute, and/or a second material attribute.

In some variations, a category for the search phrase may be determined based at least on a category of the first item description.

In some variations, the category for the search phrase may be further determined based on one or more user inputs identifying the category of the search phrase.

In some variations, the search phrase including the category associated with the search phrase and the semantic role of the first word included in the search phrase may be stored in the database.

In some variations, in response to receiving the search phrase, the database may be queried to retrieve, from the database, a second item description matching the search phrase. The second item description may be associated with a second item. The second item description may match the search phrase by at least including the second word that matches the first word in the search phrase and/or a third word that matches a fourth word in the search phrase. A semantic role for the fourth word included in the search phrase may be determined based at least on a semantic role for the fourth word included in the search phrase. The analytics results associated with the search phrase may be generated further based at least on the semantic role of the fourth word included in the search phrase.

In some variations, the querying of the database may include executing a select statement to retrieve, from the database, the first item description and the second item description. The semantic role of the first word in the search phrase and the semantic role of the fourth word in the search phrase may be determined by at least performing a group by aggregation to at least group the first item description and the second item description based on one or more common words, common semantic roles, and/or common categories.

In another aspect, there is provided a method for search phrase analysis. The method may include: receiving a search phrase including a first word; in response to receiving the search phrase, querying a database to at least retrieve, from the database, a first item description matching the search phrase, the first item description associated with a first item, and the first item description matching the search phrase by at least including a second word that matches the first word in the search phrase; determining, based at least on a semantic role of the second word included in the first item description, a semantic role for the first word included in the search phrase; and generating, based at least on the semantic role of first word included in the search phrase, an analytics result associated with the search phrase.

In some variations, one or more features disclosed herein including the following features can optionally be included in any feasible combination. The semantic role for the second word may be a headword identifying the first item.

In some variations, the semantic role of the second word may be a color attribute of the first item, a finish attribute of the first item, or a material attribute of the first item. The analytics result may identify the first item having a first color attribute, a first finish attribute, and/or a first material attribute as being associated with a larger quantity of purchases than the first item having a second color attribute, a second finish attribute, and/or a second material attribute.

In some variations, the method may further include determining, based at least on a category of the first item description, a category for the search phrase.

In some variations, the category for the search phrase may be further determined based on one or more user inputs identifying the category of the search phrase.

In some variations, the method may further include storing, in the database, the search phrase including the category associated with the search phrase and the semantic role of the first word included in the search phrase.

In some variations, the method may further include: in response to receiving the search phrase, querying the database to retrieve, from the database, a second item description matching the search phrase, the second item description associated with a second item, and the second item description matching the search phrase by at least including the second word that matches the first word in the search phrase and/or a third word that matches a fourth word in the search phrase; determining, based at least on a semantic role of the third word included in the second item description, a semantic role for the fourth word included in the search phrase; and generating, further based at least on the semantic role of the fourth word included in the search phrase, the analytics result associated with the search phrase.

In some variations, the querying of the database may include executing a select statement to retrieve, from the database, the first item description and the second item description. The semantic role of the first word in the search phrase and the semantic role of the fourth word in the search phrase may be determined by at least performing a group by aggregation to at least group the first item description and the second item description based on one or more common words, common semantic roles, and/or common categories.

In another aspect, there is provided a computer program product including a non-transitory computer readable medium storing instructions. When executed by at least one data processor, the instructions may cause operations that include: receiving a search phrase including a first word; in response to receiving the search phrase, querying a database to at least retrieve, from the database, a first item description matching the search phrase, the first item description associated with a first item, and the first item description matching the search phrase by at least including a second word that matches the first word in the search phrase; determining, based at least on a semantic role of the second word included in the first item description, a semantic role for the first word included in the search phrase; and generating, based at least on the semantic role of first word included in the search phrase, an analytics result associated with the search phrase.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to search engines, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
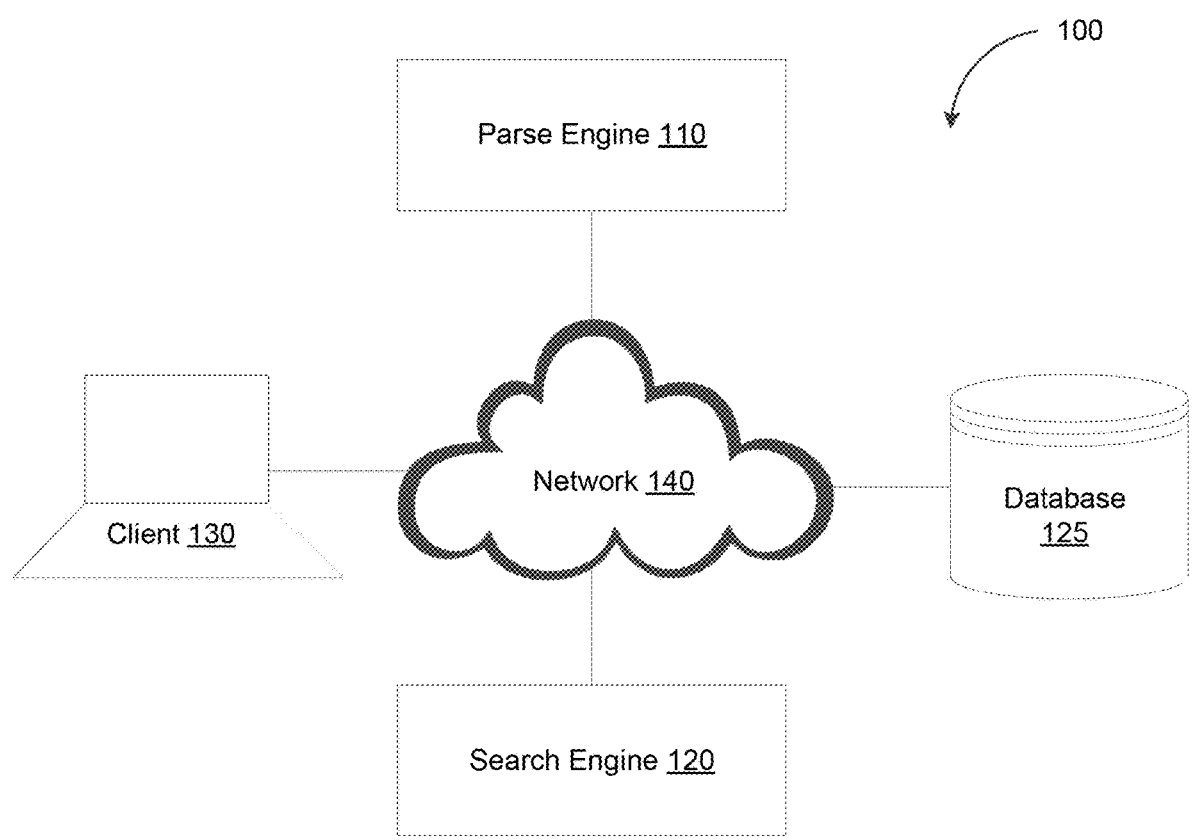
FIG. 1 depicts a system diagram illustrating a search system, in accordance with some example embodiments.

A search engine may be configured to identify one or more items that match a search phrase. For example, a user may input, into the search engine, a search phrase describing an item such as, for example, a product, a service, and/or the like. The search phrase may include one or more words. In response to the receiving the search phrase from the user, the search engine may query, based on the search phrase, a database storing a plurality of item descriptions. Each item description stored in the database may correspond to an item. Furthermore, each item description may also include one or more words. Accordingly, to identify items matching the search phase, the search engine may identify item descriptions containing words that match the words in the search phrase. Nevertheless, the search phrase may require additional analysis to determine, for example, the semantic role of each word included in the search phrase. Because the search phrase may lack grammatical structure, conventional natural language processing techniques may be unable to effectively determine the semantic roles of the words in the search phrase.

In some example embodiments, an parse engine may analyze a search phrase based at least on the item descriptions that a search engine identified as matching the search phrase. For example, the parse engine may determine, based at least on the semantic roles assigned to the words in the item descriptions matching the search phrase, the semantics roles of one or more words included in the search phrase. Alternatively and/or additionally, the parse engine may determine, based at least on the category associated with the item descriptions matching the search phrase, one or more categories for the search phrase.

In some example embodiments, the search engine may be configured to identify one or more item descriptions that match a search phrase based on a relevance of the matching words that appear in the search phrase and in each of a plurality of item descriptions stored in a database. For example, each word in an item description may be associated with a prominence score. The prominence score assigned to a word appearing in an item description may indicate the significance of that word relative to other words appearing in the same item description. For instance, the most significant word in an item description may be referred to as a headword. The headword may be one or more words that identify an item (e.g., a portable computer, stool, and/or the like). Other words in the item description may relate to various attributes of the item including, for example, a color attribute, a finish attribute, a material attribute, and/or the like. It should be appreciated that an item description may include additional words that provide neither a description nor an attribute for the corresponding item. These additional words may also be used by the search engine when identifying items that match the search phrase.

In some example embodiments, a database may store, for each item, a category for the item and as well as an item description including a semantic role for each of the words included in the item description. As such, the search engine may query the database in order to retrieve, from the database, one or more item descriptions matching the search phrase. Each item description retrieved from the database may be associated with a category. Moreover, each word in a matching item description retrieved from the database may be associated with a semantic role including, for example, headword, color attribute, material attribute, finish attribute, and/or the like. Accordingly, instead of applying a natural language processing (NLP) technique to analyze the search phrase, the parse engine may determine, based at least on the semantic roles assigned to the words in the matching item descriptions the search engine retrieved from the database, the semantics roles of one or more words included in the search phrase. Alternatively and/or additionally, the parse engine may determine, based at least on the categories associated with the matching item descriptions retrieved from the database, one or more categories for the search phrase.

FIG. 1 depicts a system diagram illustrating a system 100, in accordance with some example embodiments. Referring to FIG. 1, the search system 100 may include an parse engine 110, a search engine 120, and a client 130 that are communicative coupled via a network 140. The client 130 may be a processor-based device including, for example, a cellular phone, a smartphone, a tablet computer, a laptop computer, a desktop, a workstation, and/or the like. The network 140 may be any wired and/or wireless network including, for example, a public land mobile network (PLMN), a local area network (LAN), a wide area network (WAN), a virtual local area network (VLAN), the Internet, and/or the like.

In some example embodiments, the parse engine 110 may be configured to analyze a search phrase received, for example, from the client 130. The search phrase may include one or more words. Instead of applying a natural language processing (NLP) technique, the parse engine 110 may analyze the search phrase based on one or more item descriptions that the search engine 120 determines to match the search phrase. For example, the parse engine 110 may determine, based at least on the semantic roles assigned to the words in the matching item descriptions, the semantics roles of the one or more words included in the search phrase. Alternatively and/or additionally, the analytics 110 engine may determine, based at least on the categories associated with the matching item descriptions, one or more categories for the search phrase.

Figure 2:
FIG. 2 depicts a database table storing examples of item descriptions, in accordance with some example embodiments.

In some example embodiments, a database 125 may store, for each of a plurality of items, a category for the item and as well as an item description including a semantic role for each of the words included in the item description. The database 125 may be any type of database including, for example, a graph database, an in-memory database, a relational database, a non-SQL (NoSQL) database, and/or the like. To further illustrate, FIG. 2 depicts an example of a database table 200, in accordance with some example embodiments. The database table 200 may be stored at the database 125. Moreover, as shown in FIG. 2, the database table 200 may include plurality of item descriptions including, for example, a first item description 210a for a first item A, a second item description 210b for a second item B, and/or the like.

Referring to FIG. 2, the database table 200 may include a category for each of the first item A associated with the first item description 210a and the second item B associated with the second item description 210b. For example, the database table 200 may include the category "Portable Computers" for the first item A associated with the first item description 210a and the category "Bar/Restaurant Furniture" for the second item B associated with the second item description 210b. Furthermore, the database table 200 may include a semantic role for each of the words included in the first item description 210a and the second item description 210b. For instance, according to the database table 200, the word "tablet" in the first item description 210a may be the headword in the first item description 210a, which may be the most significant word in the first item description 210a identifying the first item A. Meanwhile, the word "black" in the first item description 210a may be a color attribute and the word "metallic" in the first item description 210a may be a finish attribute.

In some example embodiments, the search engine 120 may query the database 125 to retrieve, from the database 125, one or more item descriptions matching the search phrase received from the client 130. For example, the search engine 120 may query the database 125 to retrieve one or more item descriptions that are determined to match the search phrase based at least on a relevance score of each item description. An item description may match the search phrase if the item description include at least one word that appears in the search phrase. The relevance score for that item description may correspond to a combined prominence score of the words in the item description that match words appearing in the search phrase. For instance, each word in the item description may be assigned a prominence score corresponding to the significance of that word relative to other words in the item description.

Accordingly, the headword included in the item description, which provides a basic description of the corresponding item, may be assigned the highest prominence score. Other words in the item description, which relate to attributes of the item, may be assigned be assigned lower prominence scores. The prominence score assigned to a first word relating to a first attribute of the item may be higher (or lower) than the prominence score assigned to a second word relating to a second attribute of the item depending on the relative importance of the first attribute and the second attribute. It should be appreciated that the prominence score for the words in the item description may be determined using any technique including, for example, crowd sourcing, machine learning, and/or the like. Moreover, instead of identifying matching item descriptions based on the relevance scores of the item descriptions, the search engine 120 may apply a different technique for identifying item descriptions that match the search phrase.

To further illustrate, each word in the first item description 210a included in the database table 200 may be assigned a prominence score. For example, the headword "tablet" may be assigned the highest prominence score whereas the color attribute "black" and the finish attribute "metallic" may be assigned relevance scores corresponding to a relative importance of the color attribute and the finish attribute. The first item description 210a may match the search phrase received from the client 130 if the first item description 210a includes at least one word that appears in the search phrase. As such, the relevance score for the first item description 210a may correspond to a combined prominence score of the words in the first item description 210a that match words appearing in the search phrase.

The first item description 210a may have a higher relevance score if the search phrase include words that match the more significant words in the first item description 210a which, as noted, may be associated with higher prominence scores. By contrast, the first item description 210a may have a lower relevance score if the search phrase include words that match less significant words from the first item description 210a that are associated with lesser prominence scores. In some example embodiments, the search engine 120 may query the database 125 to return a certain quantity of matching item descriptions having a highest relevance score (e.g., item descriptions having the top n relevance scores). Alternatively and/or additionally, the search engine 120 may query the database 125 to return item descriptions having a relevance score that exceeds a threshold value. For example, the search engine 120 may query the database 125 to return item descriptions whose relevance score exceed the prominence score assigned to headwords. In doing so, the search engine 120 may ensure that the item descriptions retrieved from the database 140 include headwords that match words appearing in the search phrase.

In some example embodiments, instead of applying a natural language processing (NLP) technique, the parse engine 110 may analyze the search phrase received from the client 130 based at least on the item descriptions that the search engine 120 identified as matching the search phrase. For example, the search engine 110 may determine that the search phrase matches the first item description 210a included in the database table 200. Accordingly, the parse engine 110 may determine, based at least on the semantic roles assigned to the words in the first item description 110a, the semantics roles of one or more words included in the search phrase. Moreover, the parse engine 110 may determine, based at least on the category associated with the first item description 210a, a category for the search phrase. To further illustrate, Table 1 below depicts a result of the parse engine 110 analyzing a first search phrase "red metallic tablet" based on the first item description 210a and a second search phrase "black leather tall bar stool" based on the second item description 210b.

TABLE 1

| Input red metallic tablet | |
|---|---|
| Output | |
| tablet | head-word |
| red | color |
| metallic | finish |
| category | Portable Computers |
| Input | black leather tall bar stool |
| Output | |
| leather | material |

TABLE 1-continued

| tall | <generic> |
|---|---|
| black | color |
| bar | <generic> |
| stool | headword |
| category | Bar/Restaurant Furniture |

Figure 3A:
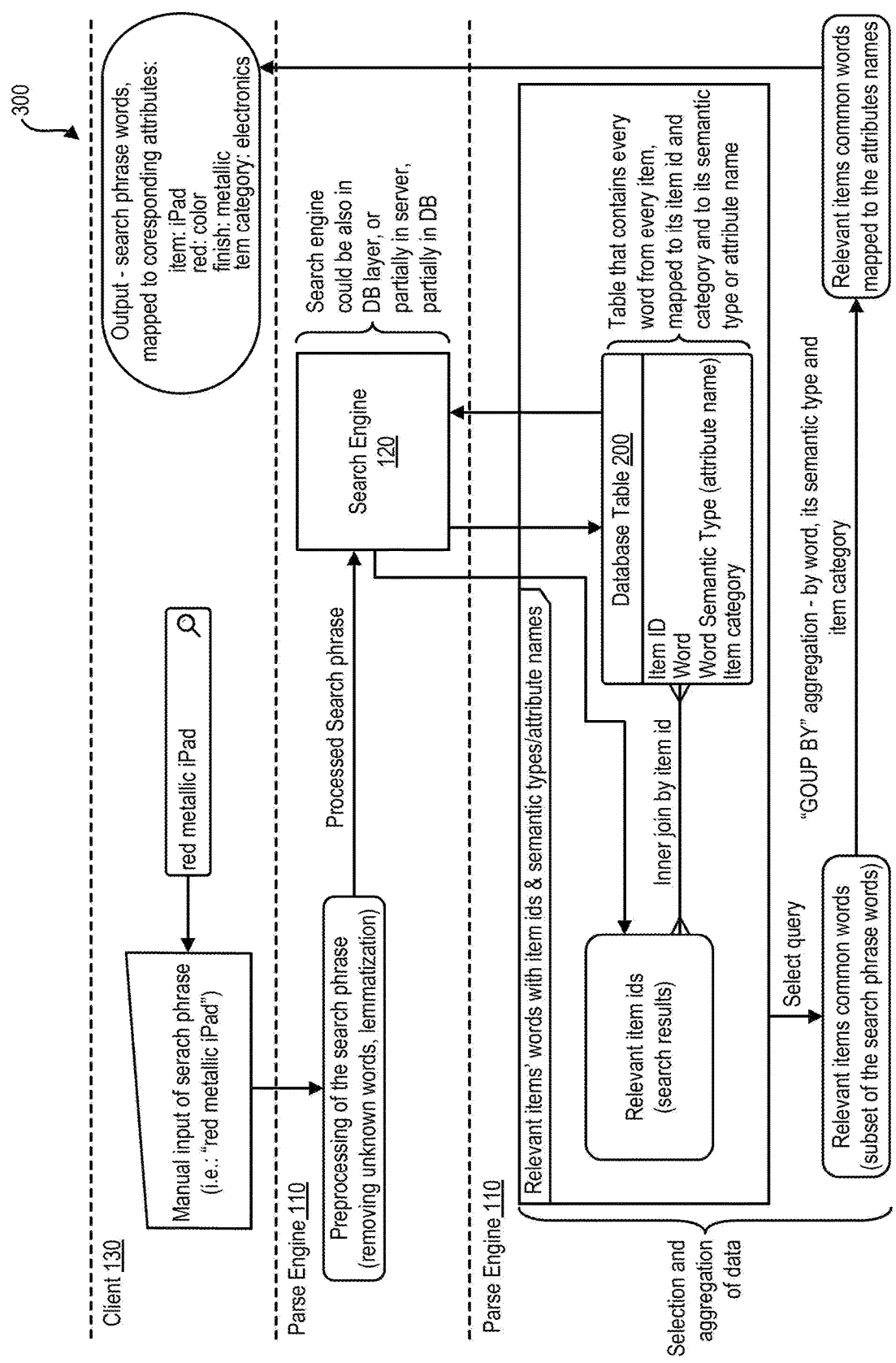
FIG. 3A depicts a flow diagram illustrating an example of a process for search phrase analysis, in accordance with some example embodiments.

FIG. 3A depicts a flow diagram illustrating an example of a process 300 for search phrase analysis, in accordance with some example embodiments. Referring to FIG. 3A, the parse engine 110 may receive, from the client 130, the search phrase "red metallic tablet." In some example embodiments, prior to sending the search phrase to the search engine 110, the parse engine 110 may preprocess the search phrase including by tokenizing the search phrase into individual words. The preprocessing of the search phrase may include removing stop words, numerical digits, non-alphabet symbols, and/or the like. Alternatively and/or additionally, the preprocessing of the search phrase may include supplementing and/or replacing one or more words from the search phrase with synonyms and/or hypernyms, which may be more general than the original words. Moreover, the parse engine 110 may preprocess the search phrase by stemming and/or lemmatizing the search phrase in order to eliminate multiple variations (e.g., inflected forms and/or the like) of the same word.

In some example embodiments, the preprocessing of the search phrase may further include resolving typographical errors appearing in the search phrase. For example, the parse engine 110 may encounter an incorrect word in the search phrase (e.g., "aple" instead of "apple," "code" instead of "core," and/or the like). In response to the presence of an incorrect word, the parse engine 110 may identify one or more correct words by at least identifying words that are a threshold distance away from the incorrect word. For instance, the parse engine 110 may identify the correct words by applying, to an incorrect word, a distance algorithm including, for example, Levenstein distance, and/or the like. The parse engine 110 may further replace the incorrect words that are present in the search phrase with the correct words.

Referring again to FIG. 3A, the parse engine 110 may send, to the search engine 120, the preprocessed search phrase. The search engine 110 may respond to receiving the preprocessed search phrase by querying the database 125 to retrieve, from the database table 200 stored at the database 125, item descriptions that match the preprocessed search phrase. As noted, the search engine 110 may determine that an item description stored in the database 125, for example, in the database table 200, matches the search phrase based at least on the relevance score for the item description, which may correspond to a combined prominence score of each word in the item description that match a word in the search phrase. However, it should be appreciated that the search engine 120 may apply a different technique for identifying item descriptions that match the search phrase.

In some example embodiments, the parse engine 110 may analyze the search phrase "red metallic tablet" based at least on the item descriptions that the search engine 120 identified as matching the search phrase. For example, as shown in FIG. 3A, the matching item descriptions may be retrieved from the database table 200 by performing an inner join on the item identifier. Moreover, for each word in the search phrase, the matching item descriptions containing the same word may be identified by a corresponding select query (e.g., a SQL select statement) before a group by aggregation (e.g., a SQL group by statement) is performed to group the matching item descriptions based on common words, common semantic roles, and/or common categories. The group by aggregation may be performed in order to map the words in the search phrase to the corresponding semantic role and category. For instance, the parse engine 110 may determine, based at least on the semantic roles assigned to the words in the matching item descriptions, the semantics roles of one or more words included in the search phrase "red metallic tablet." Moreover, the parse engine 110 may determine, based at least on the category associated with the matching item descriptions, a category for the search phrase "red metallic tablet."

Figure 3B:
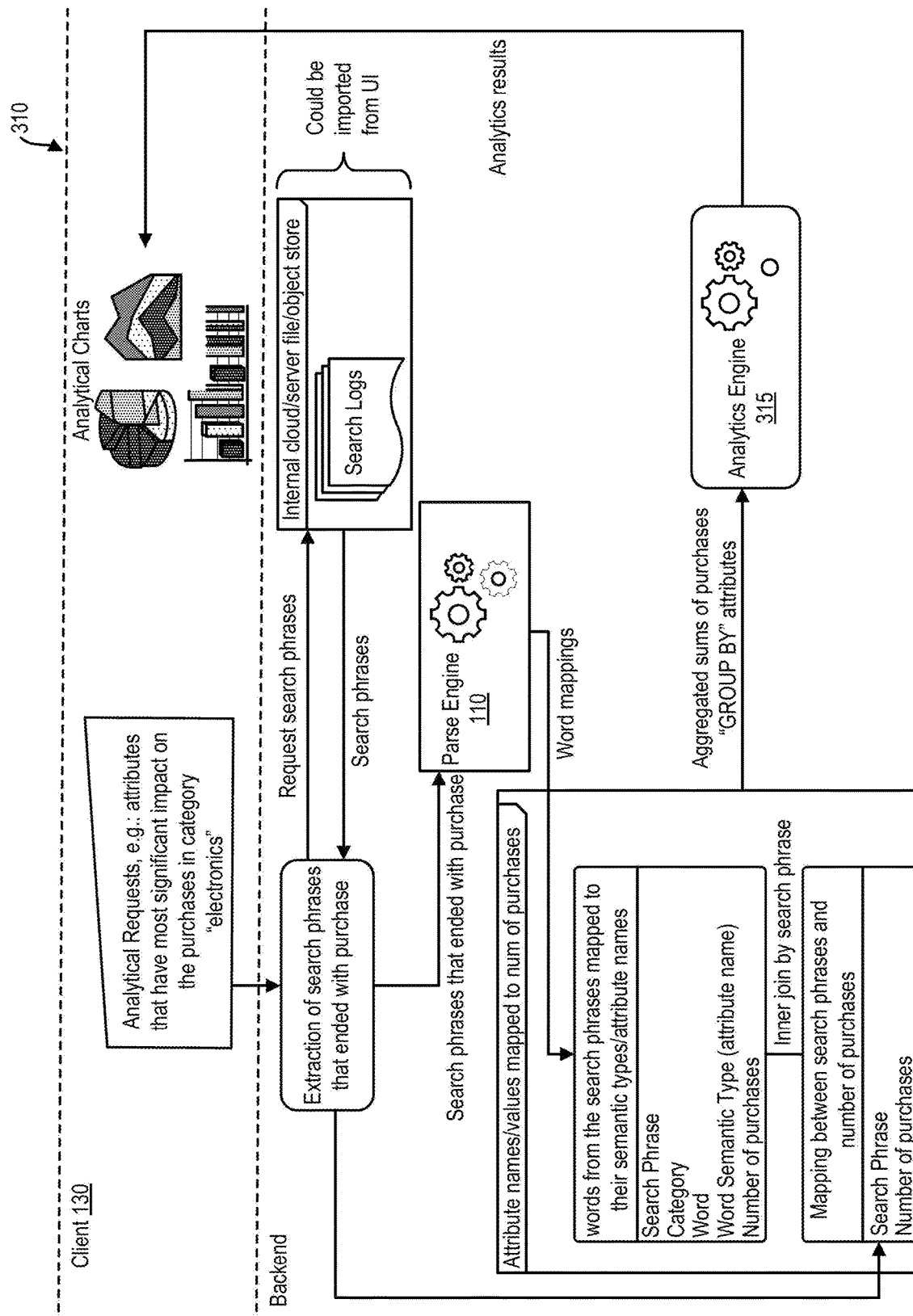
FIG. 3B depicts a flow diagram illustrating an example of a process for search phrase based analytics, in accordance with some example embodiments.

In some example embodiments, the results of the parse engine 110 analyzing one or more search phrases may be applied toward further analytics including, for example, determining one or more metrics associated with the one or more search phrases. To further illustrate, FIG. 3B depicts an example of a process 310 for search phrase based analytics, in accordance with some example embodiments. Referring to FIG. 3B, the client 130 may send an inquiry that requires identifying a relationship between the attributes of an item and purchases of the item. In order to respond to the inquiry, a backend system including the parse engine 110 and an analytics engine 315 may identify, within various search logs, search phrases that are associated with a purchase of the corresponding items.

The parse engine 110 may analyze the search phrases associated with the purchase of the corresponding items, for example, to identify words in the search phrases that relate to the attributes of the corresponding items. For example, the parse engine 110 may identify, based at least on the semantic roles assigned to the words in the item descriptions that match the search phrases associated with the purchase of the corresponding items, the words that relate to various attributes of the corresponding item including, for example, a color attribute, a finish attribute, a material attribute, and/or the like. Moreover, as shown in FIG. 3B, the search phrases that are associated with the purchase of the corresponding items may be grouped by common attributes, for example, by applying a group by aggregation based on the words relating to the attributes of the corresponding item. The analytics engine 315 may generate, based at least on the analysis performed by the parse engine 110, one or more analytics results including, for example, analytical charts depicting the relationship between the attributes of an item and purchases of the item. For example, the analytics results may identify which attributes (e.g., color attribute, finish attribute, material attribute, and/or the like) are more associated with a larger quantity of purchases of the item.

Figure 3C:
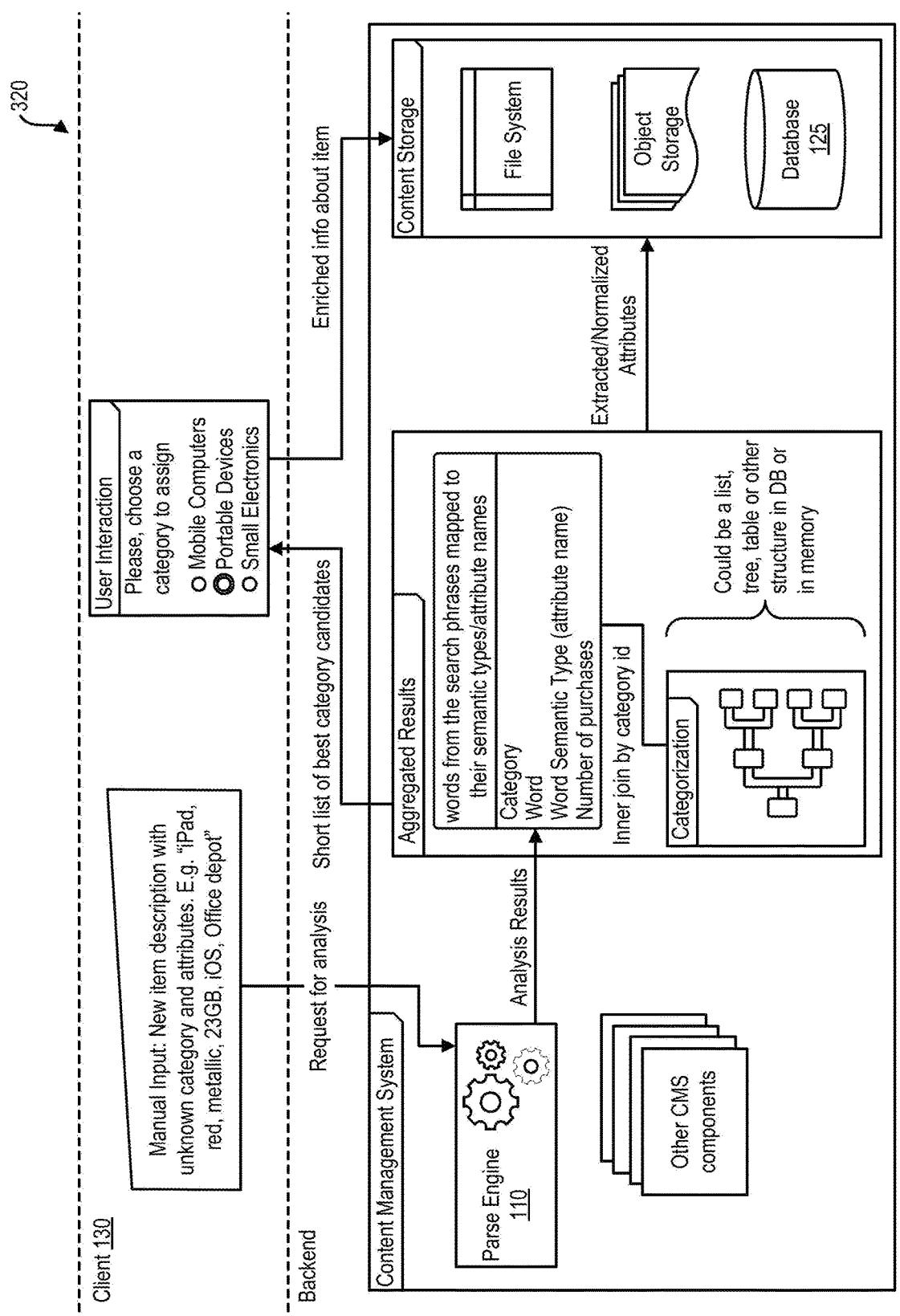
FIG. 3C depicts a flow diagram illustrating an example of a process for analyzing an item description, in accordance with some example embodiments.

In some example embodiments, the parse engine 110 may also analyze an item description including by identifying one or more categories for the item description and the semantic roles of the words in the item description. To further illustrate, FIG. 3C depicts a flow diagram illustrating an example of a process 320 for analyzing an item description, in accordance with some example embodiments. The item description may be part of a dataset, for example, a catalog, that includes other item descriptions. However, the dataset may not be normalized, in which case the categories associated with each item description as well as the semantic roles of the words included in each item description may be unknown. Storing the dataset in the database 125 in a non-normalized state may prevent the dataset being queried. As such, prior to storing the dataset in the database 125, the parse engine 110 may analyze the item descriptions included in the dataset in order to identify, for each item description, one or more categories for the item description and the sematic roles of the words included in the item description.

Referring again to FIG. 3C, the parse engine 110 may receive, from the client 130, the dataset including, for example, the item description "red metallic tablet" with an unknown category and unknown semantic roles for the words included in the item description. The parse engine 110 may analyze the item description including by determining one or more categories for the item description and a semantic role for each word (e.g., "red," "metallic," and "tablet") included in the item description. For example, the search engine 120 may query the database 125 in order to identify one or more existing item descriptions (e.g., having known categories and semantic roles) that match the item description. For each word in the item description, one or more matching item descriptions containing the same word may be identified by a corresponding select query (e.g., a SQL select statement) before a group by aggregation (e.g., a SQL group by statement) is performed to group the matching item descriptions based on common words, common semantic roles, and/or common categories.

Performing the group by aggregation may map the words in the item description to the corresponding semantic role and category. For example, the word "red" in the item description may be identified as a color attribute, the word "metallic" may be identified as a finish attribute, and the word "tablet" may be identified as the headword of the item description. Accordingly, the parse engine 110 may determine, based at least on the semantic roles assigned to the words in the matching item descriptions, the semantics roles of same words included in the item description. Moreover, the parse engine 110 may determine, based at least on the category associated with the matching item descriptions, a category for the item description. For instance, the categories associated with the matching item descriptions may include various category codes (e.g., United Nations Standard Products and Services Code (UNSPC) and/or the like). As such, the parse engine 110 may identify one or more category codes for the item description included in the dataset.

In some example embodiments, the results of the parse engine 110 analyzing the item description may be enriched based at least on user inputs received from the client 130. For example, the result of the parse engine 110 analyzing the item description may be presented at the client 130 including, for example, a first category and a second category that the parse engine 110 determined to be associated with the item description. The categories that are presented at the client 130 may be modified and/or expanded based on the user inputs received from the client 130. For instance, as shown in FIG. 3C, the user inputs may indicate that the item description is associated with the first category but not the second category. Alternatively and/or additionally, the user inputs indicate that the item description is also associated with a third category that is not part of the results of the analysis performed by the parse engine 110.

As such, when the item description is stored in the database 125, for example, in the database table 200, the item description may be associated with the first category determined by the parse engine 110 and the third category identified by the user inputs but not the second category determined by the parse engine 110. Moreover, the item description may be stored with the semantic roles assigned to each of the words included in the item description. For example, the word "red" may be stored as a color attribute, the word "metallic" may be stored as a finish attribute, and the word "tablet" may be stored as a headword. Storing the item description in the database 125 along with the corresponding categories and semantic roles may enable subsequent queries of the data included in the database 125.

Figure 4:
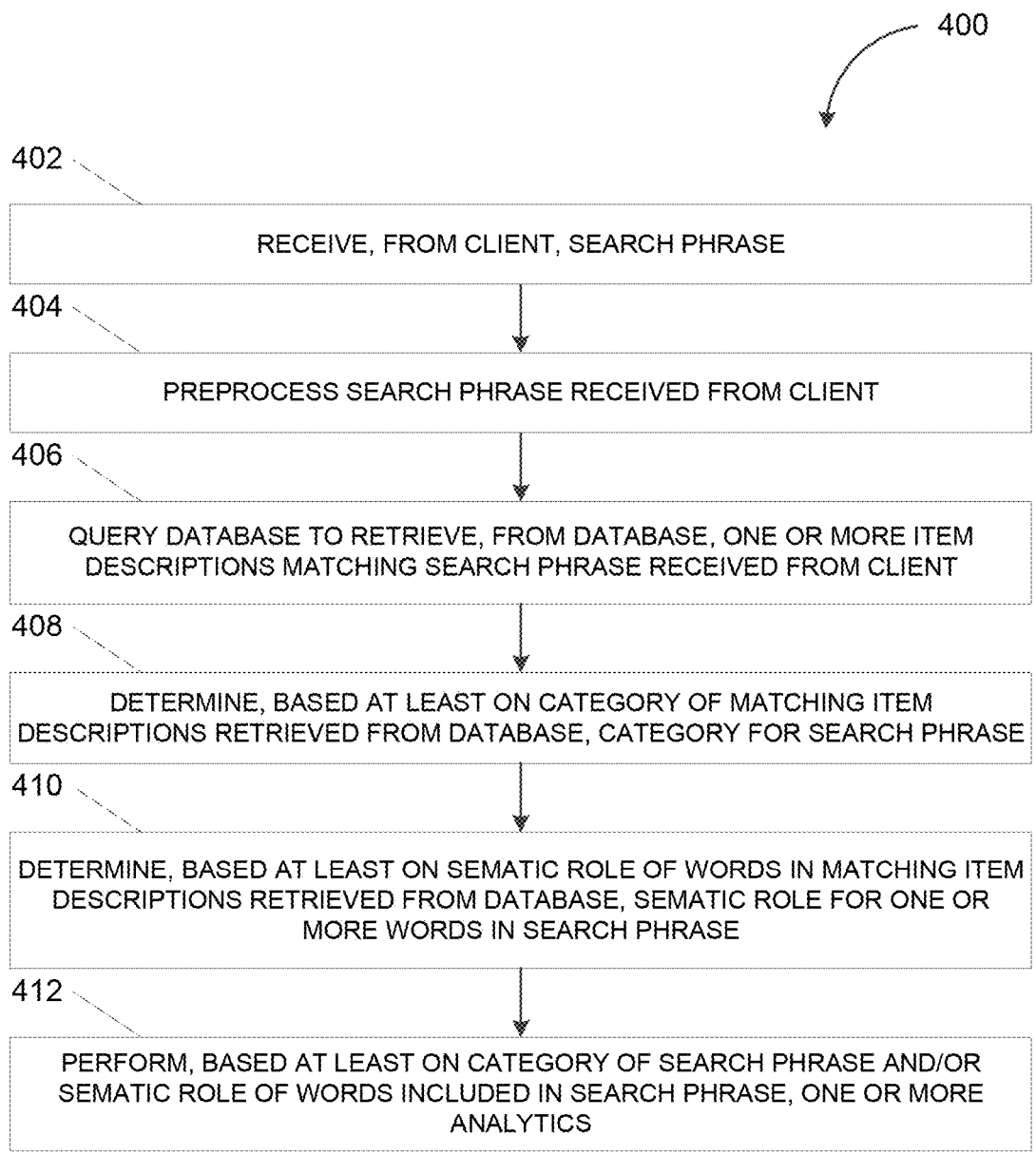
FIG. 4 depicts a flowchart illustrating a process for search phrase analysis, in accordance with some example embodiments.

FIG. 4 depicts a flowchart illustrating a process 400 for search phrase analysis, in accordance with some example embodiments. Referring to FIGS. 1-2, 3A-C, and 4, the process 400 may be performed by the parse engine 110.

At 402, the parse engine 110 may receive, from the client 130, a search phrase. For example, the parse engine 110 may receive, from the client 130, a search phrase such as "red metallic tablet."

At 404, the parse engine 110 may preprocess the search phrase received from the client 130. In some example embodiments, the parse engine 110 may preprocess the search phrase "red metallic tablet" by at least tokenizing the search phrase to individual words and cleaning the search phrase, for example, to remove stop words, numerical digits, non-alphabet symbols, and/or the like. Alternatively and/or additionally, the preprocessing of the search phrase may include lemmatizing the search phrase to eliminate multiple variations of the same word (e.g., inflected forms and/or the like). The preprocessing of the search phrase may further include supplementing and/or replacing one or more words from the search phrase with synonyms and/or hypernyms, which may be more general than the original words. The parse engine 110 may also preprocess the search phrase by replacing incorrect words with correct words identified, for example, by applying a distance algorithm (e.g., Levenstein distance and/or the like) to the incorrect words.

At 406, the search engine 120 may query the database 125 in order to retrieve, from the database 125, one or more item descriptions matching the search phrase received from the client 130. In some example embodiments, the parse engine 110 may send, to the search engine 120, the search phrase "red metallic tablet" such that the search engine 120 may query the database 125 to retrieve, from the database 125, one or more item descriptions that match the search phrase by including at least one word that match a word appearing in the search phrase. As noted, the search engine 120 may identify matching item descriptions based at least on the relevance scores of the item descriptions stored in the database 125, for example, in the database table 200. The relevance score for an item description may correspond to a combined prominence score of each word in the item description that match a word in the search phrase. Accordingly, in some example embodiments, the search engine 120 may retrieve, from the database 125, a certain quantity of matching item descriptions having a highest relevance score (e.g., item descriptions having the top n relevance scores) and/or item descriptions having an above threshold relevance score. However, it should be appreciated that the search engine 120 may apply different techniques for identifying item descriptions in the database 125 that match the search phrase "red metallic tablet."

At 408, the parse engine 110 may determine, based at least on a category of the matching item descriptions retrieved from the database 125, a category for the search phrase. For example, the search engine 110 may determine that the search phrase "red metallic tablet" matches the first item description 210a included in the database table 200. Accordingly, the parse engine 110 may determine, based at least on the category associated with the first item description 210a, a category for the search phrase "red metallic tablet." For instance, the search phrase "red metallic tablet" may be assigned the same "Portable Computers" category as the first item description 210a stored in the database table 200.

Alternatively and/or additionally, at 410, the parse engine 110 may determine, based at least on a semantic role of the words included in the matching item descriptions retrieved from the database 125, a semantic role for one or more words included in the search phrase. For example, the parse engine 110 may determine, based at least on the semantic roles assigned to the words in the first item description 110a, the semantics roles of one or more words included in the search phrase "red metallic tablet." As shown in Table 1, the parse engine 110 may determine, based at least on the semantic roles of the words included in the first item description 210a, that the word "tablet" is the headword, the word "red" is a color attribute, and the word "metallic" is a finish attribute.

At 412, the parse engine 110 may perform, based at least on a category of search phrase and/or a semantic role of the words included in the search phrase, one or more analytics. For example, as shown in FIG. 3B, the result of the analysis performed by the parse engine 110 may be used to determine a relationship between the attributes of an item and purchases of the item. As shown in FIG. 3B, the search phrases that are associated with the purchase of the corresponding items may be grouped by common attributes, for example, by applying a group by aggregation based on the words relating to the attributes of the corresponding item. The analytics engine 315 may generate, based at least on the analysis performed by the parse engine 110, one or more analytics results including, for example, analytical charts depicting the relationship between the attributes of an item and purchases of the item. For instance, the analytics results may identify which attributes (e.g., color attribute, finish attribute, material attribute, and/or the like) are more associated with a larger quantity of purchases.

Figure 5:
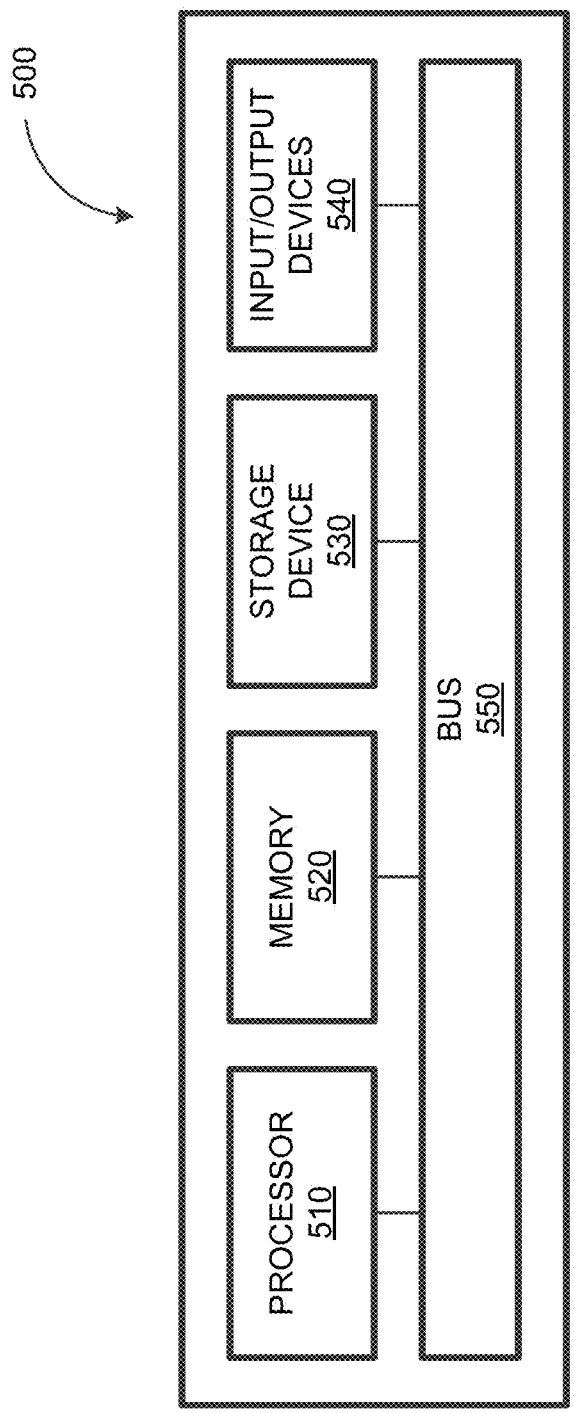
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the parse engine 110, search engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the parse engine 110, the search engine 120, and/or the like. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and at least one memory storing instructions which, when executed by the at least one data processor, result in operations comprising:

receiving a search phrase including a first word;

in response to receiving the search phrase, querying a database to at least retrieve, from the database, a first item description matching the search phrase, the first item description associated with a first item, and the first item description matching the search phrase by at least including a second word that matches the first word in the search phrase;

determining, based at least on a semantic role of the second word included in the first item description, a semantic role for the first word included in the search phrase, the semantic role of the second word comprising an attribute of the first item; and generating, based at least on the semantic role of first word included in the search phrase, an analytics result associated with the search phrase, the analytics result identifying the first item having a first attribute as being associated with a larger quantity of purchases than the first item having a second attribute.

2. The system of claim 1, wherein the semantic role for the second word comprises a headword identifying the first item.

3. The system of claim 1, wherein the attribute of the first item comprises a color attribute of the first item, a finish attribute of the first item, or a material attribute of the first item.

4. The system of claim 3, wherein the analytics result identifies the first item having a first color attribute, a first finish attribute, and/or a first material attribute as being associated with the larger quantity of purchases than the first item having a second color attribute, a second finish attribute, and/or a second material attribute.

5. The system of claim 1, further comprising:
determining, based at least on a category of the first item description, a category for the search phrase.

6. The system of claim 5, wherein the category for the search phrase is further determined based on one or more user inputs identifying the category of the search phrase.

7. The system of claim 5, further comprising:
storing, in the database, the search phrase including the category associated with the search phrase and the semantic role of the first word included in the search phrase.

8. The system of claim 1, further comprising:
in response to receiving the search phrase, querying the database to retrieve, from the database, a second item description matching the search phrase, the second item description associated with a second item, and the second item description matching the search phrase by at least including the second word that matches the first word in the search phrase and/or a third word that matches a fourth word in the search phrase;
determining, based at least on a semantic role of the third word included in the second item description, a semantic role for the fourth word included in the search phrase; and
generating, further based at least on the semantic role of the fourth word included in the search phrase, the analytics result associated with the search phrase.

9. The system of claim 8, wherein the querying of the database includes executing a select statement to retrieve, from the database, the first item description and the second item description.

10. The system of claim 8, wherein the semantic role of the first word in the search phrase and the semantic role of the fourth word in the search phrase are determined by at least performing a group by aggregation to at least group the first item description and the second item description based on one or more common words, common semantic roles, and/or common categories.

11. A computer-implemented method, comprising:
receiving a search phrase including a first word;
in response to receiving the search phrase, querying a database to at least retrieve, from the database, a first item description matching the search phrase, the first item description associated with a first item, and the first item description matching the search phrase by at least including a second word that matches the first word in the search phrase;
determining, based at least on a semantic role of the second word included in the first item description, a semantic role for the first word included in the search phrase, the semantic role of the second word comprising an attribute of the first item; and
generating, based at least on the semantic role of first word included in the search phrase, an analytics result associated with the search phrase, the analytics result identifying the first item having a first attribute as being associated with a larger quantity of purchases than the first item having a second attribute.

12. The method of claim 11, wherein the semantic role for the second word comprises a headword identifying the first item.

13. The method of claim 11, wherein the attribute of the first item comprises a color attribute of the first item, a finish attribute of the first item, or a material attribute of the first item.

14. The method of claim 13, wherein the analytics result identifies the first item having a first color attribute, a first finish attribute, and/or a first material attribute as being associated with the larger quantity of purchases than the first item having a second color attribute, a second finish attribute, and/or a second material attribute.

15. The method of claim 11, further comprising:
determining, based at least on a category of the first item description, a category for the search phrase.

16. The method of claim 15, wherein the category for the search phrase is further determined based on one or more user inputs identifying the category of the search phrase.

17. The method of claim 15, further comprising:
storing, in the database, the search phrase including the category associated with the search phrase and the semantic role of the first word included in the search phrase.

18. The method of claim 11, further comprising:
in response to receiving the search phrase, querying the database to retrieve, from the database, a second item description matching the search phrase, the second item description associated with a second item, and the second item description matching the search phrase by at least including the second word that matches the first word in the search phrase and/or a third word that matches a fourth word in the search phrase;
determining, based at least on a semantic role of the third word included in the second item description, a semantic role for the fourth word included in the search phrase; and
generating, further based at least on the semantic role of the fourth word included in the search phrase, the analytics result associated with the search phrase.

19. The method of claim 18, wherein the querying of the database includes executing a select statement to retrieve, from the database, the first item description and the second item description, and wherein the semantic role of the first word in the search phrase and the semantic role of the fourth word in the search phrase are determined by at least performing a group by aggregation to at least group the first item description and the second item description based on one or more common words, common semantic roles, and/or common categories.

20. A non-transitory computer readable medium storing instructions, which when executed by at least one data processor, result in operations comprising:
  receiving a search phrase including a first word;
  in response to receiving the search phrase, querying a database to at least retrieve, from the database, a first item description matching the search phrase, the first item description associated with a first item, and the first item description matching the search phrase by at least including a second word that matches the first word in the search phrase;
  determining, based at least on a semantic role of the second word included in the first item description, a semantic role for the first word included in the search phrase, the semantic role of the second word comprising an attribute of the first item; and
  generating, based at least on the semantic role of first word included in the search phrase, an analytics result associated with the search phrase, the analytics result identifying the first item having a first attribute as being associated with a larger quantity of purchases than the first item having a second attribute.

\* \* \* \* \*